Sept. 12, 1967 R. H. McCRACKEN 3,341,717

BINARY CIRCUIT

Filed Feb. 2, 1965

INVENTOR,
ROBERT HENRY McCRACKEN

BY Harry M. Saragovitz, Edward J. Kelly, Herbert Berl & Charles L. Whitham

ATTORNEYS

United States Patent Office 3,341,717
Patented Sept. 12, 1967

3,341,717

BINARY CIRCUIT

Robert Henry McCracken, Glen Cove, Md., assignor to the United States of America as represented by the Secretary of the Army Filed Feb. 2, 1965, Ser. No. 429,933
5 Claims. (Cl. 307—88.5)

ABSTRACT OF THE DISCLOSURE

In this disclosure is described a new binary circuit that employs as the switching element a silicon controlled rectifier which has as one of its characteristics a difference between the minimum anode current necessary to latch the device into conduction and the minimum current necessary to sustain conduction after the device has been pulsed on at a higher anode current. A load circuit is attached to the silicon controlled rectifier which permits the latching current to flow when the rectifier is gated on. The time constant of the load circuit is adjusted so that upon the decay of the gating pulse the anode current is reduced to the minimum value required to sustain conduction. When a second gating pulse is applied to the gate of the silicon controlled rectifier, conduction will be terminated upon the incidence of the leading edge of said gating pulse. This binary device can be combined with others to form a binary divider.

The invention described herein may be manufactured and used by or for the Government of the United States of America for governmental purposes without the payment to me of any royalty thereon.

This invention relates generally to binary circuits, and more particularly to bistable circuits employing silicon controlled rectifiers as the bistable element.

Bistable circuits are employed in great quantities in computer and control systems, timing circuits, and process instrumentation. Frequently in such applications, it is required that the circuits be very compact and inexpensive to construct. Often, it is also desirable to provide some sort of visual readout so that the state of individual circuits may be readily ascertained by an operator.

It is therefore an object of this invention to provide a bistable circuit having a minimum number of circuit elements thereby permitting very compact and inexpensive construction.

It is another object of the invention to provide a simple and inexpensive bistable circuit that provides a visual indication of its state.

According to the present invention, the foregoing and other objects are attained by providing a silicon controlled rectifier with a load circuit which permits at least the minimum anode current to flow that is necessary to latch the device into conduction when pulsed ON and which thereafter decreases the anode current to less than the minimum required to latch the device into conduction but greater than the minimum necessary to sustain conduction after the device has been pulsed ON.

The specific nature of the invention, as well as other objects, aspects, uses and advantages thereof, will clearly appear from the following description and from the accompanying drawing, in which.

Figure 1:
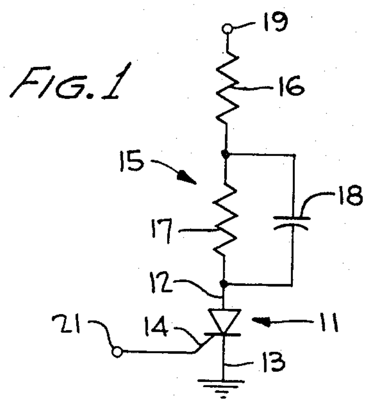
FIGURE 1 is a schematic diagram of a first embodiment of the invention.

Some silicon controlled rectifiers display a difference between the minimum anode current necessary to latch into conduction when the device is pulsed ON and the minimum anode current necessary to sustain conduction after the device has been pulsed ON at a higher anode current. This is an unpublished yet fairly common characteristic of silicon controlled rectifiers. In order to measure the minimum sustaining current, it is necessary that the controlling gate voltage, subsequent to establishing anode-cathode conduction, be reduced below a critical value or removed altogether before the anode current is reduced below the minimum latching current. Otherwise, conduction will be lost upon either reduction of anode current below the minimum latching current, or subsequent reduction of the gate voltage below a critical value depending upon anode current. The required conditions for operation are met by first pulsing the silicon controlled rectifier ON at an adequate level of anode current, then, following the decay of the trigger pulse, reducing the anode current to a value below the minimum latching current but above the extinction value.

This "hanging" range between the minimum latching current and the minimum sustaining current comprises two subranges which exhibit somewhat different behaviorisms. In the upper subrange, conduction may be terminated by the application and removal of a small gate voltage of the same polarity as that used to establish conduction. This gate voltage may be either a pulse or a slowly-applied, increased, and reduced D.C. voltage. The gate voltage must first reach some sufficient value and then be reduced through some critical level, whereupon anode conduction will be abruptly terminated. If a pulse is applied, conduction will be terminated on the decay or trailing edge of the pulse. If the anode current is adjusted to be in the lower subrange, anode conduction may be terminated by the application of a gate voltage as before, but upon increasing the gate voltage or on the leading edge of a gate pulse. In general, a lower gate voltage is required for termination than for establishment of anode conduction.

To utilize this turn-off mechanism in a binary circuit, it is necessary to limit the trigger pulse switch, and provide for reducing the anode current, subsequent to establishment of anode conduction and decay of the trigger pulse, to the appropriate value to allow the next succeeding gate pulse to terminate conduction. This latter requirement is met by the circuit shown in FIGURE 1 of the drawing. Here, a P-type silicon controlled rectifier 11 in which the gating electrode is connected to the isolated P region having an anode electrode 12, a cathode electrode 13, and a gate electrode 14, has a load impedance 15 connected in series with anode electrode 12. The load impedance 15 includes a first resistor 16 connected in series with a second resistor 17 and a capacitor 18 shunting the resistor 17. The cathode electrode 13 of silicon controlled rectifier 11 is connected to ground, and a source of positive voltage (not shown) is connected in series with the load impedance 15 at terminal 19. Positive gating pulses are applied to the gate electrode 14 of silicon controlled rectifier 11 at terminal 21. The resistance of resistor 16 should allow sufficient anode current, through the displacement current through capacitor 18, to provide positive latching. The series resistance of resistors 16 and 17 should establish the anode current at an appropriate level in the hanging range. The capacitance of capacitor 18 must be sufficient so that the RC time constant of the anode current is sufficient to permit the required decay of the gate pulse before the anode current falls below the minimum latching current. With the appropriate combination of parameters, this circuit may be alternately triggered ON and OFF by successive gate pulses of the same polarity.

Figure 2:
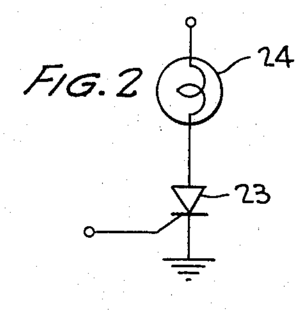
FIGURE 2 is a schematic diagram of a second embodiment of the invention which provides visual readout.

FIGURE 2 shows a simplified version of the circuit shown in FIGURE 1 wherein a P-type silicon controlled rectifier 23 has as its anode load impedance a low voltage incandescent lamp 24 having a positive temperature coefficient. Incandescent lamp 24 is the physical equivalent of the load impedance 15 shown in FIGURE 1 where the cold resistance of the lamp is equivalent to the resistance of resistor 16, the hot resistance of the lamp is equivalent to the series resistance of resistors 16 and 17, and the thermal time constants of the lamp are equivalent to the charging and discharging time constants of the circuit shown in FIGURE 1. Noteworthy of the circuit shown in FIGURE 2 is that while it requires only two elements, a silicon controlled rectifier and an incandescent lamp, it also provides a visual readout.

Figure 3:
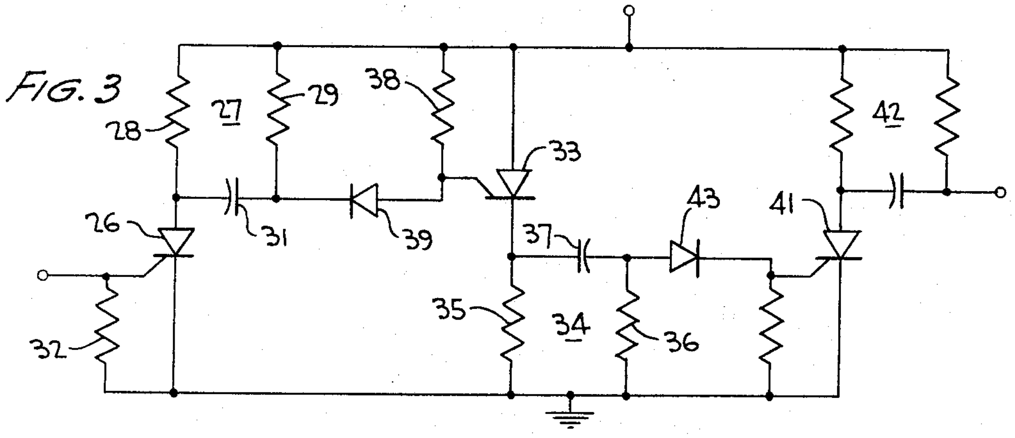
FIGURE 3 is a schematic diagram of a third embodiment of the invention connected to form a three stage binary divider.

FIGURE 3 illustrates one way of cascading a plurality of bistable circuits to form a binary divider. The first stage of the divider comprises a P-type silicon controlled rectifier 26 having an anode load impedance 27. Load impedance 27 includes a resistor 28 connected in parallel with a resistor 29 connected in series with a capacitor 31, the capacitor 31 being connected directly to the anode of silicon controlled rectifier 26. A resistor 32 is shown connected between the gate electrode and the cathode of silicon controlled rectifier 26. Resistor 32 is provided to prevent the inadvertent short circuiting of the gate electrode and the cathode and the resulting damage that would be caused to the silicon controlled rectifier. Since this resistor forms an integral part of many silicon controlled rectifiers, it often need not be separately provided in the circuit. Load impedance 27 is equivalent to load impedance 15 shown in FIGURE 1 where the parallel resistance of resistors 28 and 29 are equal to the resistance of resistor 16, the resistance of resistor 28 is equal to the series resistance of resistors 16 and 17, and the time constant provided by the capacitance of capacitor 31 is equal to the time constant provided by capacitance of capacitor 18. The configuration of the load impedance 27 has the advantage of permitting capacitor 31 to serve as the coupling capacitor between stages. As such, capacitor 31 acts as a differentiator providing trigger pulses at the leading and trailing edges of the output pulse of the stage. The second stage of the divider comprises an N-type silicon controlled rectifier 33 having a load impedance 34 connected between the cathode of silicon controlled rectifier 33 and ground. Load impedance 34 comprises a resistor 35 connected in parallel with a resistor 36 connected in series with a capacitor 37, the capacitor 37 being directly connected to the cathode of silicon controlled rectifier 33. Load impedance 34 serves exactly the same function as load impedance 27 with capacitor 37 acting as a coupling capacitor between stages. A resistor 38 is connected between the gate electrode and the anode of silicon controlled rectifier 33 and serves a similar function as that performed by resistor 32. Since silicon controlled rectifier 33 is an N-type, or one in which the gating electrode has been connected to the isolated N region of the rectifier, negative trigger pulses are required to pulse it ON; therefore, a diode 39 is connected between capacitor 31 and the gate electrode of silicon controlled rectifier 33 with the anode of diode 39 connected directly to the gate electrode of silicon controlled rectifier 33. The diode 39 is required to block the positive trigger pulses produced by capacitor 31 because under some conditions silicon controlled rectifiers may also be triggered OFF by pulses of the opposite polarity from that required to trigger them ON. The third stage of the binary divider is identical with the first stage and includes a P-type silicon controlled rectifier 41 and an anode load impedance 42. A diode 43 is connected between capacitor 37 and the gate electrode of silicon controlled rectifier 41. Diode 43 is poled to pass positive trigger pulses and block negative trigger pulses produced by capacitor 37 since P-type silicon controlled rectifiers require positive pulses to be pulsed ON.

Figure 4:
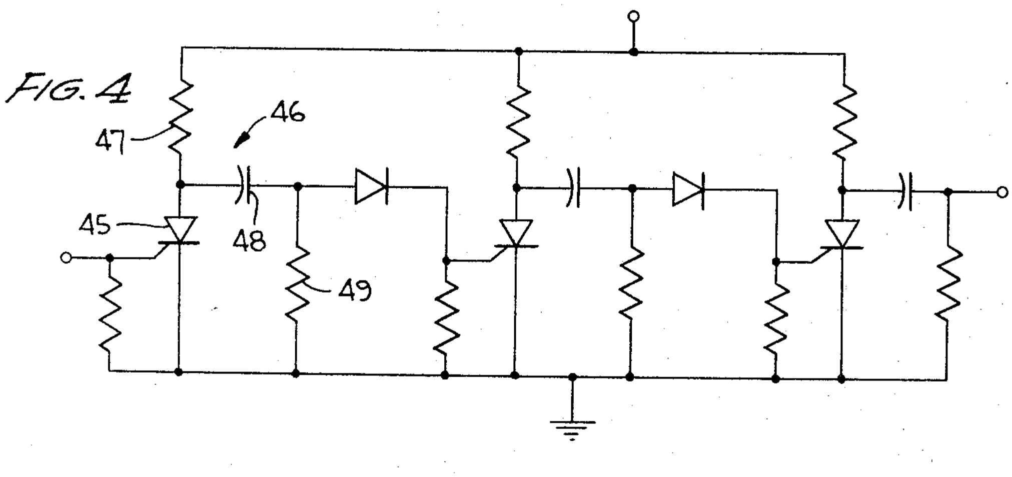
FIGURE 4 is a schematic diagram of a fourth embodiment of the invention connected to form a three stage binary divider.

The binary divider shown in FIGURE 4 illustrates another method of cascading the binary circuits. In this case, the first stage of the binary divider comprises a P-type silicon controlled rectifier 45 having an anode load impedance 46. Load impedance 46 comprises a voltage divider formed by series connected resistor 47, capacitor 48, and resistor 49. The anode of silicon controlled rectifier 45 is connected to the junction of resistor 47 and capacitor 48. Initially, capacitor 48 is charged, and the anode of silicon controlled rectifier 45 is at the supply potential. When a trigger pulse is applied to the gate electrode, silicon controlled rectifier 45 will conduct causing capacitor 48 to discharge. The discharge current of capacitor plus the current supplied by the power supply through resistor 47 is sufficient to latch the silicon controlled rectifier ON. Once capacitor 48 has discharged, the anode current is determined only by resistor 47. The resistance of resistor 47 is chosen so that the anode current falls into the hanging region as before. Capacitor 48 also serves the function of a coupling capacitor between stages in the same manner as capacitors 31 and 37 in FIGURE 3. The succeeding stages of the binary divider shown in FIGURE 4 are identical with the first stage with blocking diodes connected between the coupling capacitor of one stage and the gate electrode of the next succeeding stage.

It will be apparent that the embodiments shown are only exemplary and that various modifications can be made in construction and arrangement within the scope of the invention as defined in the appended claims.

I claim as my invention:

1. A bistable circuit comprising:

(a) a silicon controlled rectifier having an anode electrode, a cathode electrode, and a gate electrode, a characteristic of said silicon controlled rectifier being that there is a difference between the minimum anode current necessary to latch said silicon controlled rectifier into conduction and the minimum anode current necessary to sustain conduction, and (b) load circuit means connected to said silicon controlled rectifier for permitting at least the minimum anode current to flow that is necesary to latch said silicon controlled rectifier into conduction when triggered by a pulse applied to said gate electrode and for thereafter after said pulse applied to said gate electrode has decayed, decreasing the anode current to less than the minimum required to latch said silicon controlled rectifier into conduction but greater than the minimum anode current necessary to sustain conduction after said silicon controlled rectifier has been triggered into conduction, (c) said gate electrode being capable of receiving a a pulse having a duration less than the time required for said load circuit means to decrease said anode current to less than the minimum required to latch said silicon controlled rectifier whereby the next succeeding gate pulse will terminate conduction in the silicon controlled rectifier.

2. A bistable circuit as defined in claim 1 wherein said load circuit means comprises:

(a) a first resistor having a resistance which allows sufficient anode current to provide positive latching of said silicon controlled rectifier into conduction, (b) a second resistor connected in series with said first resistor, the resistance of said series connected first and second resistors establishing an anode current less than the minimum current required to latch said silicon controlled rectifier into conduction but greater than the minimum current required to sustain the conduction of said silicon controlled rectifier, and (c) a capacitor connected in parallel with said second resistor, the capacitance of said capacitor being sufficient to provide an RC time constant of the anode current permit the required decay of a trigger pulse before the anode current falls below the minimum latching current.

3. A bistable circuit as recited in claim 1 wherein said load circuit means comprises: a temperature sensitive resistance having a positive temperature coefficient and a thermal time constant greater than the duration of said pulse.

4. A bistable circuit as recited in claim 1 wherein said load circuit means comprises:

(a) a first resistor having a resistance which establishes an anode current less than the minimum current required to latch said silicon controlled rectifier into conduction but greater than the minimum current required to sustain the conduction of said silicon controlled rectifier after said silicon controlled rectifier has been triggered into conduction by a pulse applied to said gate electrode, (b) a second resistor, the parallel resistance of said first and second resistors allowing sufficient anode current to provide positive latching of said silicon controlled rectifier, (c) a capacitor connected in series with said second resistor, said series connected second resistor and said capacitor being connected in parallel with said first resistor, the capacitance of said capacitor being sufficient to provide an RC time constant of the anode current to permit the required decay of a trigger pulse before the anode current falls below the minimum latching current.

5. A bistable circuit as recited in claim 1 wherein said load circuit means comprises:

(a) a resistor connected to said anode electrode and having a resistance which establishes an anode current less than the minimum current required to latch said silicon controlled rectifier into conduction but greater than the minimum current required to sustain the conduction of said silicon controlled rectifier after said silicon controlled rectifier has been triggered into conduction by a pulse applied to said gate electrode, and (b) a capacitor connected to said anode electrode to provide a discharge current when said silicon controlled rectifier is triggered into conduction which discharge current when added to the current established by said resistor provides sufficient anode current to provide positive latching of said silicon controlled rectifier into conduction, the capacitance of said capacitor being sufficient to provide an RC time constant of the anode current to permit the required decay of a trigger pulse before the anode current falls below the minimum latching current.

References Cited

UNITED STATES PATENTS

| | | | |
|---|---|---|---|
| 2,718,951 | 9/1955 | Mason | 317—123 |
| 2,734,133 | 2/1956 | Riley | 328—210 |
| 3,142,780 | 7/1964 | Rich | 315—84.5 |
| 3,171,112 | 2/1965 | Martin | 315—136 |
| 3,181,039 | 4/1965 | Binder et al. | 317—154 |
| 3,194,987 | 7/1965 | Mandel | 307—88.5 |
| 3,260,858 | 7/1966 | Kueber | 307—88.5 |
| 3,302,041 | 1/1967 | Poston | 307—88.5 |
| 3,313,953 | 4/1967 | Bohm | 307—88.5 |

ARTHUR GAUSS, *Primary Examiner.*

J. JORDAN, *Assistant Examiner.*